Patented Dec. 13, 1927.

1,652,217

UNITED STATES PATENT OFFICE.

JOHN A. SCHAEFFER, OF ST. LOUIS, AND JOHN H. CALBECK, OF JOPLIN, MISSOURI, AND JOHN R. CRENSHAW, OF EAST ST. LOUIS, ILLINOIS, ASSIGNORS TO THE EAGLE-PICHER LEAD COMPANY, OF CINCINNATI, OHIO, A CORPORATION OF OHIO.

RED LEAD AND METHOD OF MAKING THE SAME.

No Drawing. Application filed May 9, 1925, Serial No. 29,236. Renewed October 21, 1927.

Our invention relates to the manufacture of a red lead pigment and the object of our invention is to produce a red lead having distinctively advantageous qualities as compared with known red leads in that it has greater tinctorial strength, a greater fineness, a higher oil absorbtion and a more orange color and also having the advantages that when converted into a red lead paint such paint will stand up better than such paints as heretofore made when applied to smooth surfaces at a given consistency.

Our improved method consists in thoroughly mixing together masses of litharge, one prepared from ordinary ground litharge prepared by grinding the litharge resulting from subjecting melted lead to the usual furnace treatment for producing litharge, and the other a fumed litharge condensed from volatilized litharge and characterized by a very fine state of subdivision, then subjecting the mixed mass to oxidation in a reverberatory furnace to convert the mixed lead oxides to a general composition of $Pb_3O_4$. The pigment produced is milled in the ordinary manner and is ready for the market and is found to be distinguished from known commercial red leads in the above noted features.

Our improved pigment is in a sense a mixture of ordinary red lead and orange mineral and in its qualities closely approximates those of orange mineral as heretofore generally produced though it is less costly to produce.

For the best results we prefer to use ground and fumed litharge in approximately equal quantities and the color and tinctorial strength can be varied by changing the proportions but we have not found it to be advantageous to vary the proportions more than fifteen percent above or below the fifty percent mixture.

Our new red lead pigment can be produced by a thorough mixing together of red lead and orange mineral prepared in the usual ways but while the same in kind a pigment produced in this way is not equal in quality to one produced by our described new method of manufacture.

We use the term litharge with reference to the ground product we employ in our new method as comprehending all varieties of furnace products and ground PbO including what in earlier practice was generally termed massicot, that is to say litharge formed by oxidizing lead in a furnace in which the temperature is maintained below the melting point of litharge. This so-called massicot and litharge formed at higher temperature are converted into red lead by further oxidation under the same conditions as to furnace practice.

Having now described our invention, what we claim as new and desire to secure by Letters Patent, is:

1. The method of manufacturing red lead which consists in intimately mixing finely ground litharge prepared by subjecting a bath of melted lead to the ordinary furnace treatments and grinding the produced litharge with fumed litharge and oxidizing the mixed mass in a reverberatory furnace to a general composition of $Pb_3O_4$.

2. The method of claim 1, further characterized by mixing the two varieties of litharge in approximately equal quantities.

3. A red lead pigment consisting of an intimate mixture of red lead and orange mineral.

4. The red lead pigments consisting of mixed red lead and orange mineral produced simultaneously by subjecting a mixture of ground and fumed litharge to oxidation in a reverberatory furnace.

JOHN A. SCHAEFFER.
JOHN H. CALBECK.
JOHN R. CRENSHAW.